US010486911B2

(12) United States Patent
Watson et al.

(10) Patent No.: US 10,486,911 B2
(45) Date of Patent: *Nov. 26, 2019

(54) SYSTEMS AND METHODS FOR TENSIONING A CONVEYOR IN A MINING SYSTEM

(71) Applicant: Joy MM Delaware, Inc., Wilmington, DE (US)

(72) Inventors: Charles W. Watson, Paris, KY (US); William L. Harney, Millersburg, KY (US)

(73) Assignee: Joy Global Underground Mining LLC, Warrendale, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/944,219

(22) Filed: Apr. 3, 2018

(65) Prior Publication Data

US 2018/0222683 A1 Aug. 9, 2018

Related U.S. Application Data

(63) Continuation of application No. 15/489,384, filed on Apr. 17, 2017, now Pat. No. 9,932,177.

(60) Provisional application No. 62/323,170, filed on Apr. 15, 2016.

(51) Int. Cl.
*B65G 23/44* (2006.01)
*E21F 13/06* (2006.01)
*B65G 19/10* (2006.01)

(52) U.S. Cl.
CPC ............ *B65G 23/44* (2013.01); *E21F 13/066* (2013.01); *B65G 19/10* (2013.01)

(58) Field of Classification Search
CPC ........ E21F 13/066; B65G 23/44; B65G 19/10

USPC .................................................. 198/813–815
See application file for complete search history.

(56) References Cited

U.S. PATENT DOCUMENTS

| 2,612,988 | A | * | 10/1952 | Andrews | A01D 45/023 |
|---|---|---|---|---|---|
| | | | | | 198/814 |
| 3,382,729 | A | | 5/1968 | Steinke | |
| 3,777,879 | A | | 12/1973 | Dehne | |
| 4,284,192 | A | | 8/1981 | Taylor | |
| 4,657,131 | A | | 4/1987 | Brychta et al. | |
| 4,995,506 | A | | 2/1991 | Langenbacher et al. | |
| 5,030,173 | A | | 7/1991 | Bryant | |
| 5,131,528 | A | | 7/1992 | Bandy, Jr. | |
| 5,632,372 | A | | 5/1997 | Steinbuchel, IV et al. | |

(Continued)

FOREIGN PATENT DOCUMENTS

GB 2042453 A * 9/1980 ............. B65D 23/44

OTHER PUBLICATIONS

International Search Report with Written Opinion for Application No. PCT/US2017/027966 dated Jul. 12, 2017 (11 pages).

*Primary Examiner* — Mark A Deuble
(74) *Attorney, Agent, or Firm* — Michael Best & Friedrich LLP

(57) ABSTRACT

A tensioning system for a conveyor element of a conveyor. The tensioning system including a hydraulic apparatus, a locking plate, and a take-up bar. The hydraulic apparatus includes a cylinder having an extendible piston. The take-up bar is coupled to the cylinder and coupled to a shaft of the conveyor. The take-up bar moves the shaft of the conveyor in a forward direction away from the centerline of the conveyor when overcoming a locking force from the locking plate.

7 Claims, 15 Drawing Sheets

(56) References Cited

U.S. PATENT DOCUMENTS

| | | | |
|---|---|---|---|
| 5,647,640 A | 7/1997 | Heintzmann et al. | |
| 5,895,332 A | 4/1999 | Olson et al. | |
| 6,695,130 B1 | 2/2004 | Blaylock et al. | |
| 7,322,462 B2 * | 1/2008 | Landry | B65G 23/44 198/812 |
| 7,520,378 B2 * | 4/2009 | Hansen | E01H 1/042 198/716 |
| 7,861,843 B2 | 1/2011 | Aulanko et al. | |
| 9,415,940 B2 | 8/2016 | Slavov et al. | |
| 9,932,177 B2 | 4/2018 | Watson et al. | |
| 2010/0270131 A1 | 10/2010 | Vasey | |
| 2011/0024268 A1 | 2/2011 | Merten et al. | |
| 2013/0015043 A1 | 1/2013 | Tout et al. | |
| 2015/0321856 A1 | 11/2015 | De Goede et al. | |

\* cited by examiner

US 10,486,911 B2

SYSTEMS AND METHODS FOR TENSIONING A CONVEYOR IN A MINING SYSTEM

RELATED APPLICATIONS

The present application claims priority to U.S. patent application Ser. No. 15/489,384, filed on Apr. 17, 2017, which claims priority to U.S. Provisional Application No. 62/323,170 filed on Apr. 15, 2016, the contents of both of which are incorporated herein by reference.

FIELD OF APPLICATION

The present application relates to methods and systems used for tensioning a conveyor, such as an armored face conveyor ("AFC") or a beam state loader ("BSL")

SUMMARY

In one embodiment, the application provides a tensioning system for a conveyor element of a conveyor. The tensioning system including a hydraulic apparatus, a locking plate, and a take-up bar. The hydraulic apparatus includes a cylinder having an extendible piston. The take-up bar is coupled to the cylinder and coupled to a shaft of the conveyor. The take-up bar moves the shaft of the conveyor in a forward direction away from the centerline of the conveyor when overcoming a locking force from the locking plate.

In yet another embodiment, the application provides a method of tensioning a conveyor element of a conveyor. The method includes generating, with a proximity sensor, an output signal indicative of the conveyor element being under-tensioned, and receiving, with an electronic processor, the output signal from the proximity sensor. The method further includes activating, with the electronic processor, a hydraulic apparatus including a cylinder having an extendible piston, and pushing, with the cylinder, a take-up bar coupled to the cylinder and to a shaft of the conveyor. The method further includes imparting, via a locking plate, a locking force on the take-up bar, overcoming the locking force from the locking plate, and moving the shaft of the conveyor away from a centerline of the conveyor with the take-up bar when the cylinder is driven and the locking force is overcome.

Other aspects of the application will become apparent by consideration of the detailed description and accompanying drawings.

Before any embodiments of the application are explained in detail, it is to be understood that the application is not limited in its application to the details of the configuration and arrangement of components set forth in the following description or illustrated in accompanying drawings. The application is capable of other embodiments and of being practiced or of being carried out in various ways. Also, it is to be understood that the phraseology and terminology used herein are for the purpose of description and should not be regarded as limiting. The user of "including," "comprising," or "having" and variations thereof herein are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments of the application may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the application may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components may be utilized to implement the application. For example, "servers" and "computing devices" described in the specification can include one or more processing units, one or more computer-readable medium modules, one or more input/output interfaces, and various connections (e.g., a system bus) connecting the components.

DETAILED DESCRIPTION

Figure 1:
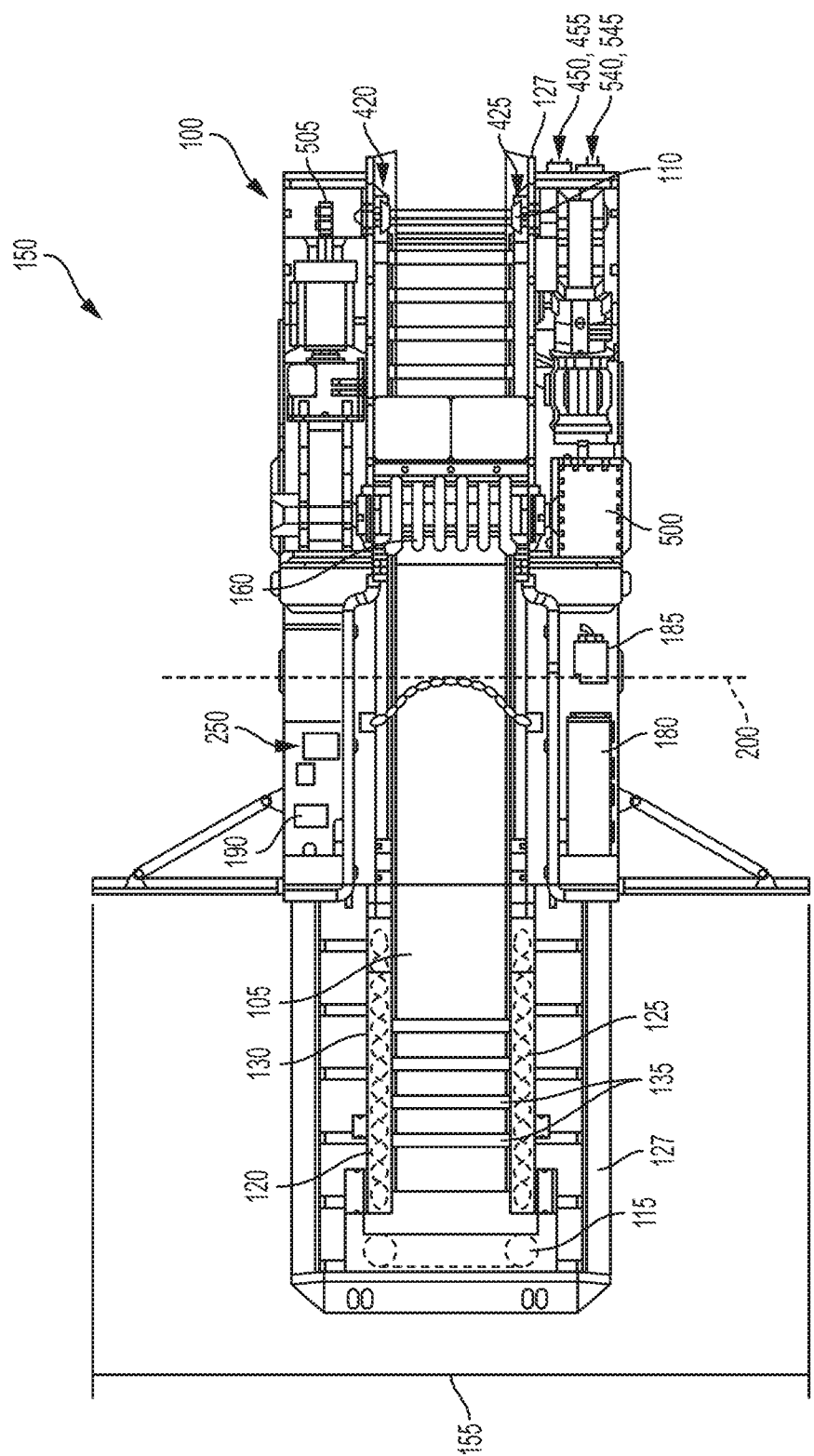
FIG. 1 illustrates a top view of a crusher of a mining system according to one embodiment of the application.

FIG. 1 illustrates a conveyor system 100 used for transporting mining material. As shown in FIG. 1, the conveyor system 100 includes a conveyor 105, two drive shafts (i.e., a head shaft 110, and a tail shaft 115 (shown in phantom)), a first chain 120 (shown in phantom), and a second chain 125 (shown in phantom). As shown in FIG. 1, the head shaft 110 and the tail shaft 115 are supported by a frame 127 and are positioned on opposite ends of the conveyor 105. The tail shaft 115 is located at an intake end of the crusher 150 and acts as an idler. The first chain 120 and the second chain 125

(e.g., the conveyor elements) are positioned around the head shaft 110 and the tail shaft 115 to form the conveyor 105. As shown in FIG. 1, the first chain 120 is positioned around the first end of the head shaft 110 and around the first end of the tail shaft 115 (e.g., a right end of the head shaft 110 and the tail shaft 115). The second chain 125 is positioned around the second end of the head shaft 110 and around the second end of the tail shaft 115 (e.g., a left end of the head shaft 110 and the tail shaft 115). The chains 120, 125 are driven by one or more drive mechanisms (e.g., motors), and the movement of the chains 120, 125 around the head shaft 110 and the tail shaft 115 cause the conveyor 105 to transport the mining material. In the illustrated embodiment, the first chain 120 is different (e.g., a different type or different size) than the second chain 125. In the illustrated embodiment, the conveyor 105 also includes chain covers 130 and conveyor flights 135 linking the conveyor chains 120, 125.

Figure 2:
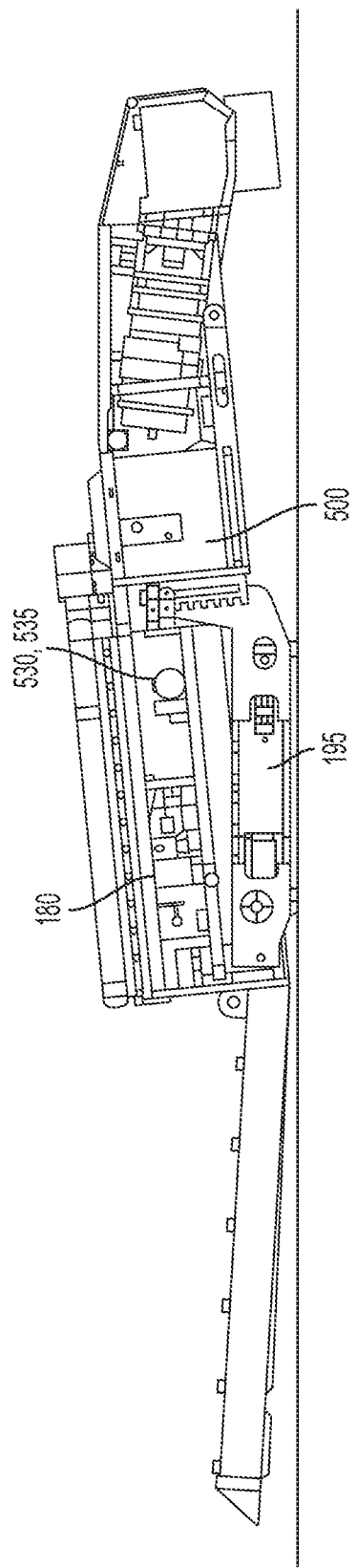
FIG. 2 illustrates a side view of the crusher of FIG. 1.

In the illustrated embodiment, the conveyor system 100 is part of a mobile crusher 150. The crusher 150 includes a hopper 155 for providing mining material to the conveyor 105. The conveyor 105 transports the mining material to a crushing mechanism 160 where at least some of the mining material is crushed to achieve a target size. As shown in FIGS. 1 and 2, the crusher 150 also includes a starter box 180, control valves 185, and other control components 190 for operating the crusher 150. The crusher 150 is mounted on two crawlers 195 (only one of which is shown in FIG. 2) for mobility. In other embodiments, the crawlers 195 could be replaced with wheels suitable for providing mobility in a mining environment. Further, the conveyor system 100 can be part of a different mining machine such as, for example, an armored face conveyor.

For the conveyor system 100 to efficiently transport mining material from a first location to a second location, the chains 120, 125 of the conveyor 105 are properly tensioned. Proper conveyor tension is achieved by adjusting the position of the tail shaft 115 with respect to the head shaft 110. When the tail shaft 115 and/or the head shaft 110 are positioned farther apart (e.g., farther from a conveyor centerline 200 in FIG. 1), the conveyor 105 is under higher tensioned (i.e., more tensioned). When the tail shaft 115 and the head shaft 110 are positioned closer to each other (e.g., closer to the conveyor centerline 200), the conveyor 105 is under less tension (i.e., less tensioned).

Figure 3:
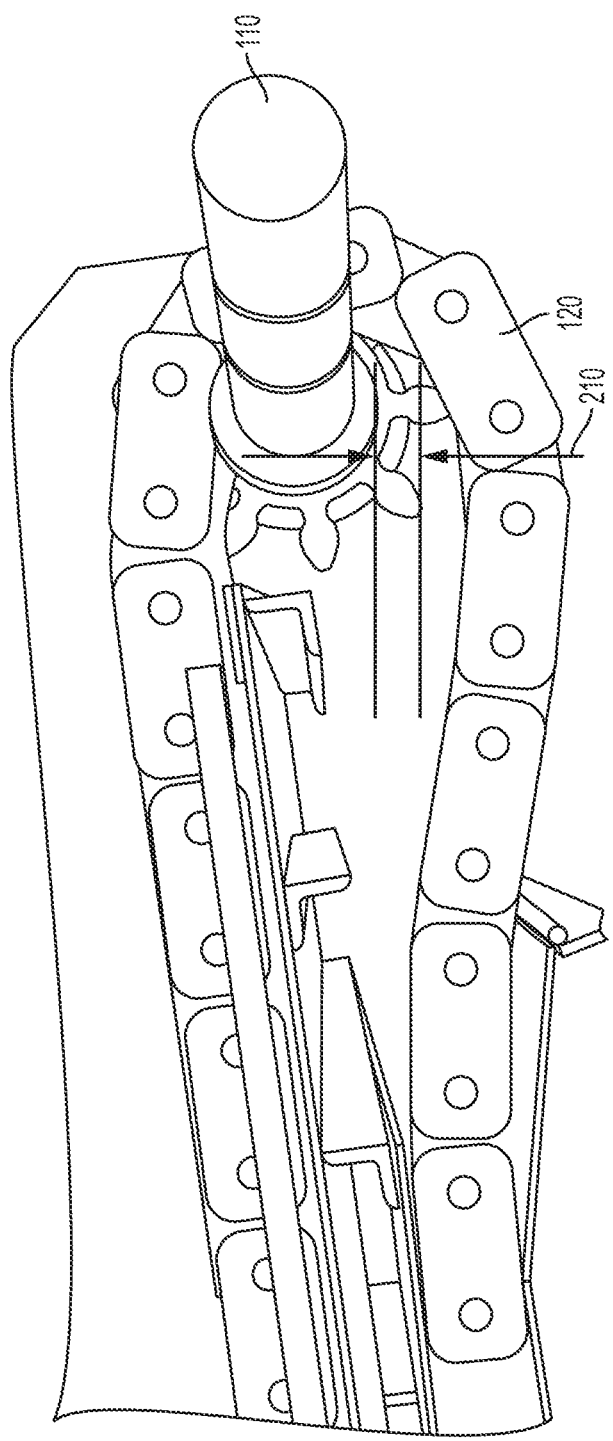
FIG. 3 illustrates an improperly tensioned conveyor of the mining system of FIG. 1.

FIG. 3 illustrates an example of an improperly tensioned chain 120. The conveyor chains 120, 125 are properly tensioned when a slack distance 210 between the head shaft 110 and the conveyor chains 120, 125 is within a predetermined distance range. The slack distance 210 is visible from behind the head shaft 110, and corresponds to a distance between the lowest portion of the conveyor chains 120, 125 in a discharge area of the conveyor 105 (e.g., the area occupied by the chains after the chain wraps around the head shaft 110). In the illustrated embodiment, the predetermined distance range for the slack distance 210 is between approximately 15 millimeters (mm) and approximately 50 mm. A slack distance 210 of less than, for example, 15 mm indicates the conveyor 105 is over-tensioned, and a slack distance 210 of more than 50 mm indicates the conveyor 105 is under-tensioned. In other embodiments, however, the predetermined distance range may be different based on, for example, the length of the conveyor and/or the weight of the material transported by the conveyor. FIG. 3, however, illustrates a slack distance 210 between the head shaft 110 and the first chain 120 that exceeds the predetermined distance range. In the example of FIG. 3, the slack distance 210 is approximately 55 mm. When the chains 120, 125 are under-tensioned, the slack distance 210 may also be referred to as "droop" of the chain 120, 125.

Figure 6:
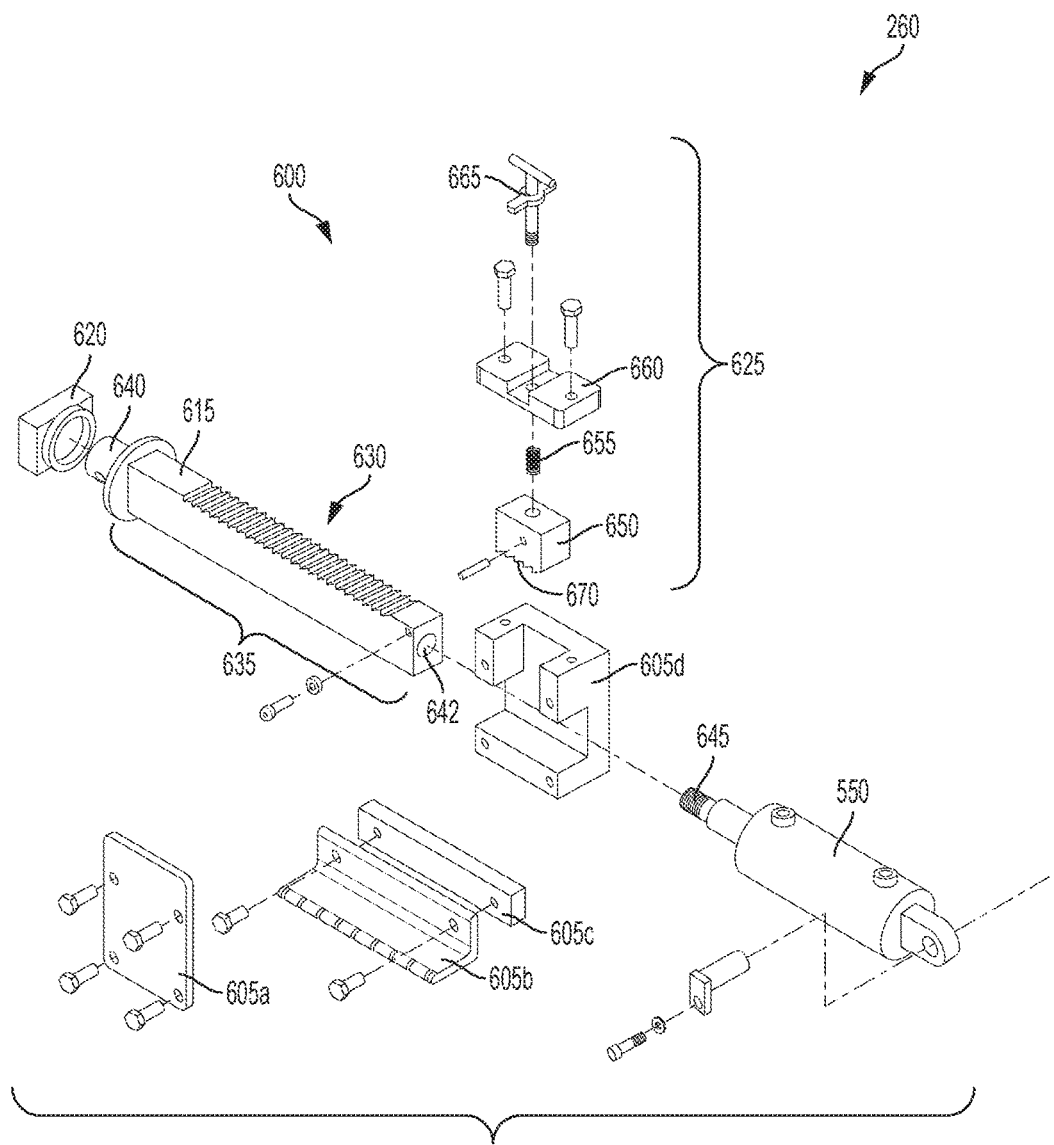
FIG. 6 is an exploded view of a mechanical subsystem of the conveyor tensioning system.
Figure 7:
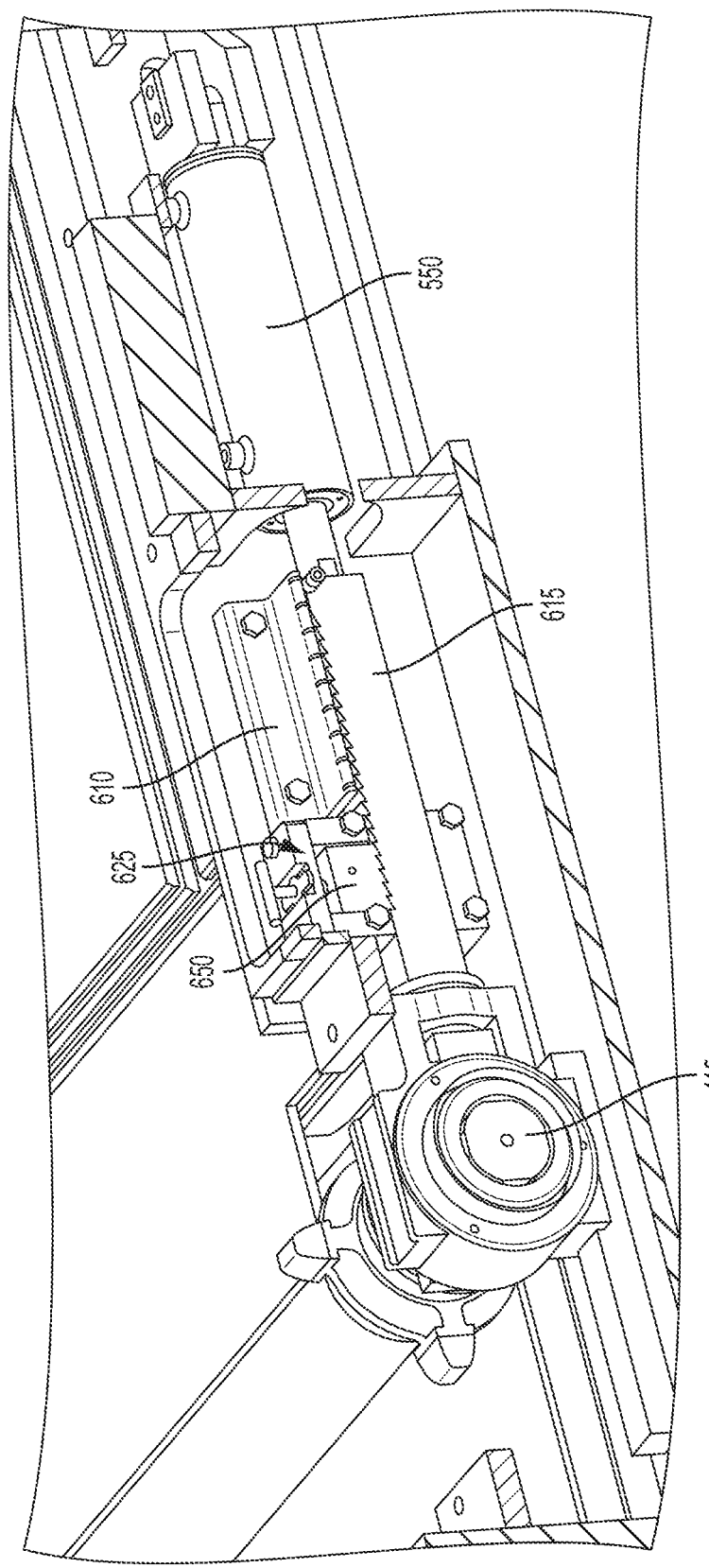
FIG. 7 is a perspective view of the mechanical subsystem of the conveyor tensioning system.
Figure 8:
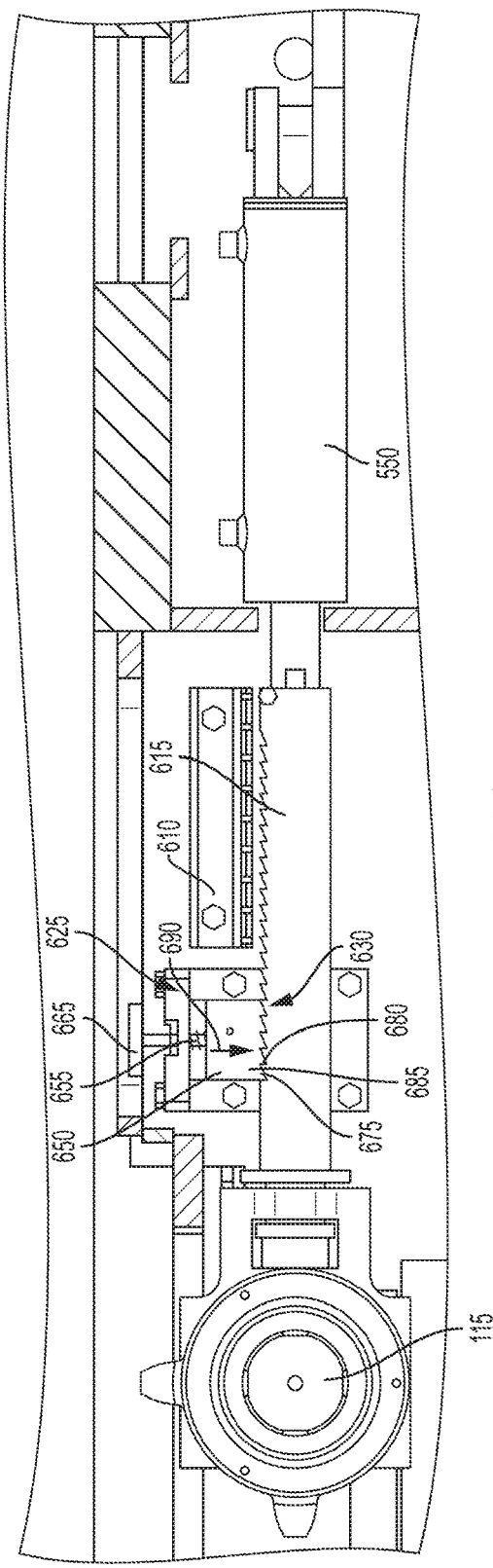
FIG. 8 illustrates a side view of the mechanical subsystem of the conveyor tensioning system.

The conveyor system 100 includes a conveyor tensioning system to automatically shift the head shaft 110 and/or the tail shaft 115 away from each other to properly tension the conveyor 105. The conveyor tensioning system includes an electronic subsystem 250 (FIG. 4), a hydraulic subsystem 255 (FIG. 5), and a mechanical subsystem 260 (FIGS. 6-8). The electronic subsystem 250 receives signals from actuators and sensors and sends activation signals to the hydraulic subsystem 255 based on the received signals. The hydraulic subsystem 255 is activated by the electronic subsystem 250 and drives the mechanical subsystem 260. The mechanical subsystem 260 moves (e.g., pushes) one of the drive shafts 110, 115 of the conveyor 105 toward or away from the centerline 200 of the conveyor 105 to tension the conveyor 105 until the conveyor 105 is properly tensioned.

Figure 4:
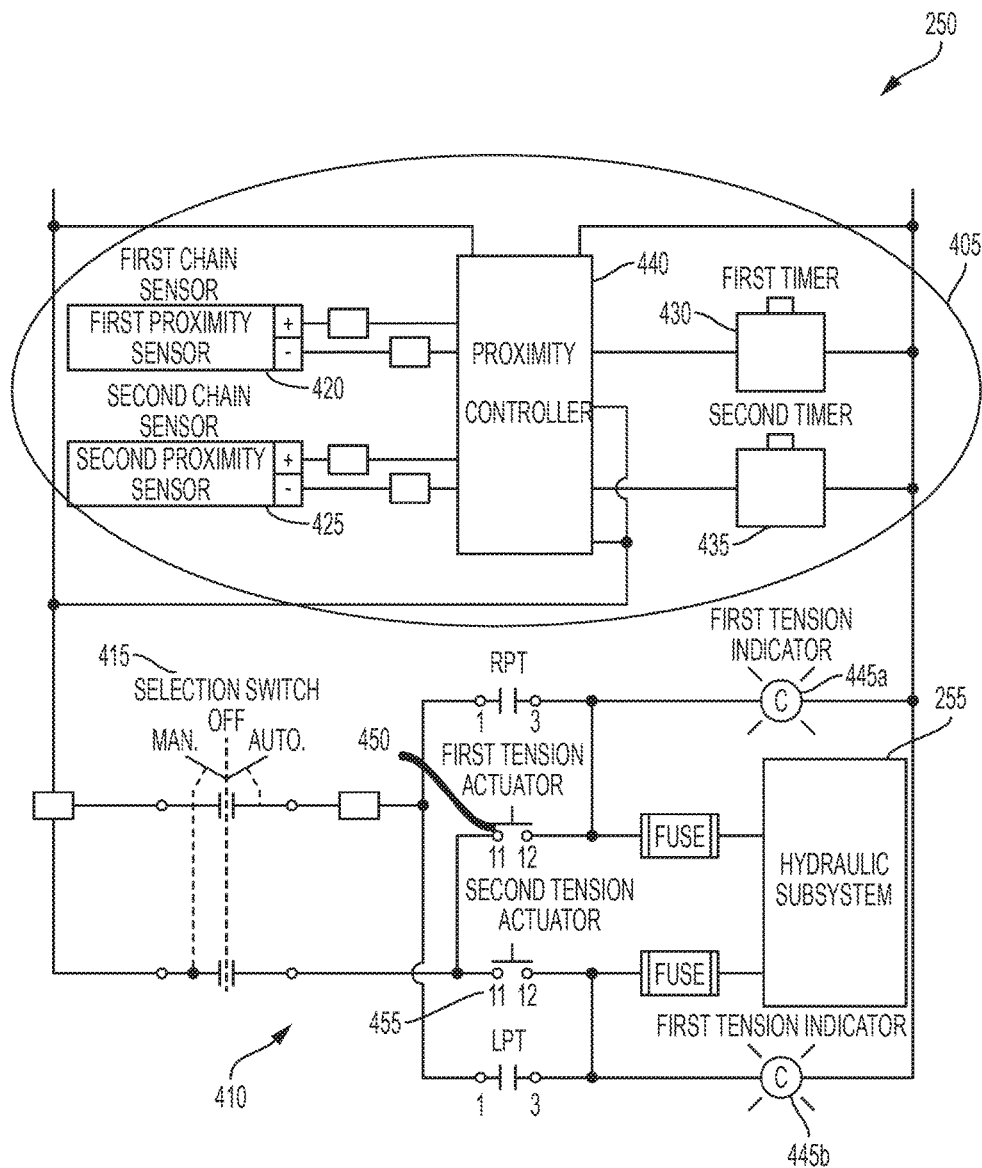
FIG. 4 is a schematic diagram of an electrical subsystem of a conveyor tensioning system.

FIG. 4 is a schematic diagram of the electronic subsystem 250 of the conveyor tensioning system. As shown in FIG. 4, the electronic subsystem 250 includes an automatic control circuit 405, a manual control circuit 410, and a mode selector 415. Both the automatic control circuit 405 and the manual control circuit 410 are coupled to the hydraulic subsystem 255 to activate and control the hydraulic subsystem 255. The mode selector 415 is coupled to the automatic control circuit 405 and the manual control circuit 410. The mode selector 415 receives an indication from a user (e.g., an operator of the mining system) of a desired mode of operation for the conveyor tensioning system. In the illustrated embodiment, the mode selector 415 includes a switch that is switchable (e.g., movable) between three positions. When the mode selector 415 is in a first state (e.g., a first position), the conveyor tensioning system operates in a manual mode. When the mode selector 415 is in a second state (e.g., a second position), the conveyor tensioning system operates in an automatic mode, and when the mode selector 415 is in a third state (e.g., a third position), the conveyor tensioning system is deactivated (i.e., powered off). The mode selector 415 then communicates with the automatic control circuit 405 and with the manual control circuit 410 regarding the selected mode of operation. The mode selector 415 may be, for example, a rotator switch movable between the three positions. In some embodiments, the mode selector 415 is not movable between three positions, but rather, the mode selector 415 includes a plurality of switches or actuators to indicate the selected mode of operation.

The automatic control circuit 405 includes a first chain sensor 420, a second chain sensor 425, a first proximity timer 430, a second proximity timer 435, and an electronic processor 440. Referring back to FIG. 1, the first chain sensor 420 and the second chain sensor 425 are positioned on the frame 127 of the conveyor 105 near the head shaft 110. The first and second chain sensors 420, 425 generate a first and second output signal, respectively, when the corresponding (e.g., first and second) chain 120, 125 is detected by the first and second chain sensors 420, 425, respectively, while the corresponding chain 120, 125 is within a predetermined distance (e.g., within a detection range) of the first and second chain sensors 420, 425. In particular, the first chain sensor 420 generates a first proximity signal corresponding to whether the first chain 120 is within a predetermined distance from the first chain sensor 420. The second chain sensor 425 generates a second proximity signal corresponding to whether the second chain 125 is within a predetermined distance from the second end of the head shaft 110. In the illustrated embodiment, the first and second chain sensors 420, 425 are positioned low enough on the frame 127 such that the first and second output signals are indicative of a tension characteristic of the conveyor 105. In other words, the first and second output signals indicate that the first and second chains 120, 125, respectively, are under-tensioned, causing the right and left chains 120, 125 to hang low enough that the first and second chain sensors 420, 425 detect the first and second chains 120, 125. The first chain sensor 420 and the second chain sensor 425 may include, for example, infrared sensors, ultrasonic sensors, inductive sensors, capacitive sensors, magnetic sensors, and/or contact brush switches or levers. Although in the illustrated embodiment, the automatic control circuit 405 only includes one sensor in each of the first side (e.g., the right side) and the second side (e.g., the left side) of the head shaft 110, in some embodiments, the automatic control circuit 405 may include more than one sensor in each of the first side and the second side to obtain a more precise determination of the distance between the chains 120, 125 and the head shaft 110. For example, the electronic processor 440 may be able to determine to which degree the first chain 120 or the second chain 125 are under-tensioned based on the proximity signals from various sensors 420, 425 mounted to the conveyor 105. In another example, the electronic processor 440 may determine when the first chain 120 is properly tensioned based on receiving an output signal from a third proximity sensor positioned higher on the frame than the first chain sensor 420.

The first proximity timer 430 and the second proximity timer 435 are coupled to the electronic processor 440. The first proximity timer 430 and the second proximity timer 435 determine when a predetermined hold period has elapsed. In the illustrated embodiment, the hold period is approximately 30 seconds. In other embodiments, the hold period may be shorter or longer based on, for example, a length of the conveyor 105.

The electronic processor 440 is coupled to the first chain sensor 420, the second chain sensor 425, the first proximity timer 430, the second proximity timer 435, the mode selector 415, and the hydraulic subsystem 255. The electronic processor 440 includes, among other things, a processing unit, a memory, inputs units, and output units. The processing unit may include, for example, a control unit, an arithmetic logic unit, and a plurality of registers. The processing unit, the memory, the input units, and the output units, as well as the various modules connected to the electronic processor 440 are connected by one or more control and/or data busses. In some embodiments, the electronic processor 440 may be implemented partially or entirely on a semiconductor chip, a field-programmable gate-array ("FPGA"), an application specific integrated circuit, and the like. The electronic processor 440 is configured to retrieve from memory and execute, among other things, instructions related to the control processes and methods described herein. In other constructions, the electronic processor 440 includes additional, fewer, or different components.

The electronic processor 440 receives the proximity signals from the first and second chain sensors 420, 425. The electronic processor 440 uses the proximity signals to determine a distance between the chains 120, 125 and the head shaft 110. The electronic processor 440 receives an indication from the mode selector 415 when the mode selector is in the first position (i.e., the automatic mode of operation is selected). The electronic processor 440 sends an activation signal to the first proximity timer 430 and the second proximity timer 435. The electronic processor 440 also monitors the first and second proximity timers 430, 435 to determine when the hold period has elapsed. The electronic processor 440 also communicates with the hydraulic subsystem 255 to control the hydraulic subsystem 255 and thereby control the position of the tail shaft 115 in relation to the head shaft 110. In embodiments in which more than one proximity sensor monitors each chain 120, 125, the electronic processor 440 may determine the duration of the hold period based on which proximity sensors generate the proximity signals. That is, if only the proximity sensor closest to the head shaft 110 indicates that the first chain 120 is within the detection range, the electronic processor 440 may reduce the duration of the first proximity timer 430.

In the illustrated embodiment, the electronic processor 440 is also coupled to output controls 445a, 445b to provide indications to the user regarding the state of the conveyor tensioning system. The output controls 445a, 445b include a first tension indicator 445a and a second tension indicator 445b. In the illustrated embodiment, the output controls 445a, 445b include LEDs used to indicate when the first chain 120 and the second chain 125 are being tensioned. In other embodiments, however, the output controls 445a, 445b may include one or more displays indicating when the first chain 120 and second chain 125 are being tensioned, as well as other information such as, for example, the current slack distance 210 associated with the first chain 120 and the slack distance 210 associated with the second chain 125. In some embodiments, the first and second tension indicators 445a, 445b may alternatively or additionally indicate when the conveyor 105 is properly tensioned. In yet other embodiments, the output controls 445a, 445b may include speakers that emit a sound when the first chain 120 and the second chain 125 are properly tensioned.

The manual control circuit 410 includes a first tension actuator 450 and a second tension actuator 455. The manual control circuit 410 receives a signal from the mode selector 415 when the mode selector 415 is in the second position (i.e., the manual mode of operation is selected). As shown in FIG. 4, the first tension actuator 450 and the second tension actuator 455 are coupled to the hydraulic subsystem 255. When actuated, the first tension actuator 450 and the second tension actuator 455 activate and control the hydraulic subsystem 255. In the illustrated embodiment, the first and second tension actuators 450, 455 are push-buttons. In other embodiments, the first and second tension actuators 450, 455 may be switches, sliders, virtual or "soft" buttons, or other type of actuators. The first and second tension actuators 450, 455 are also coupled to the output controls 445a, 445b such that even when the first and second tension actuators 450, 455 control the hydraulic subsystem 255, the output controls 445a, 445b indicate a state of the conveyor tensioning system to the user.

Figure 5:
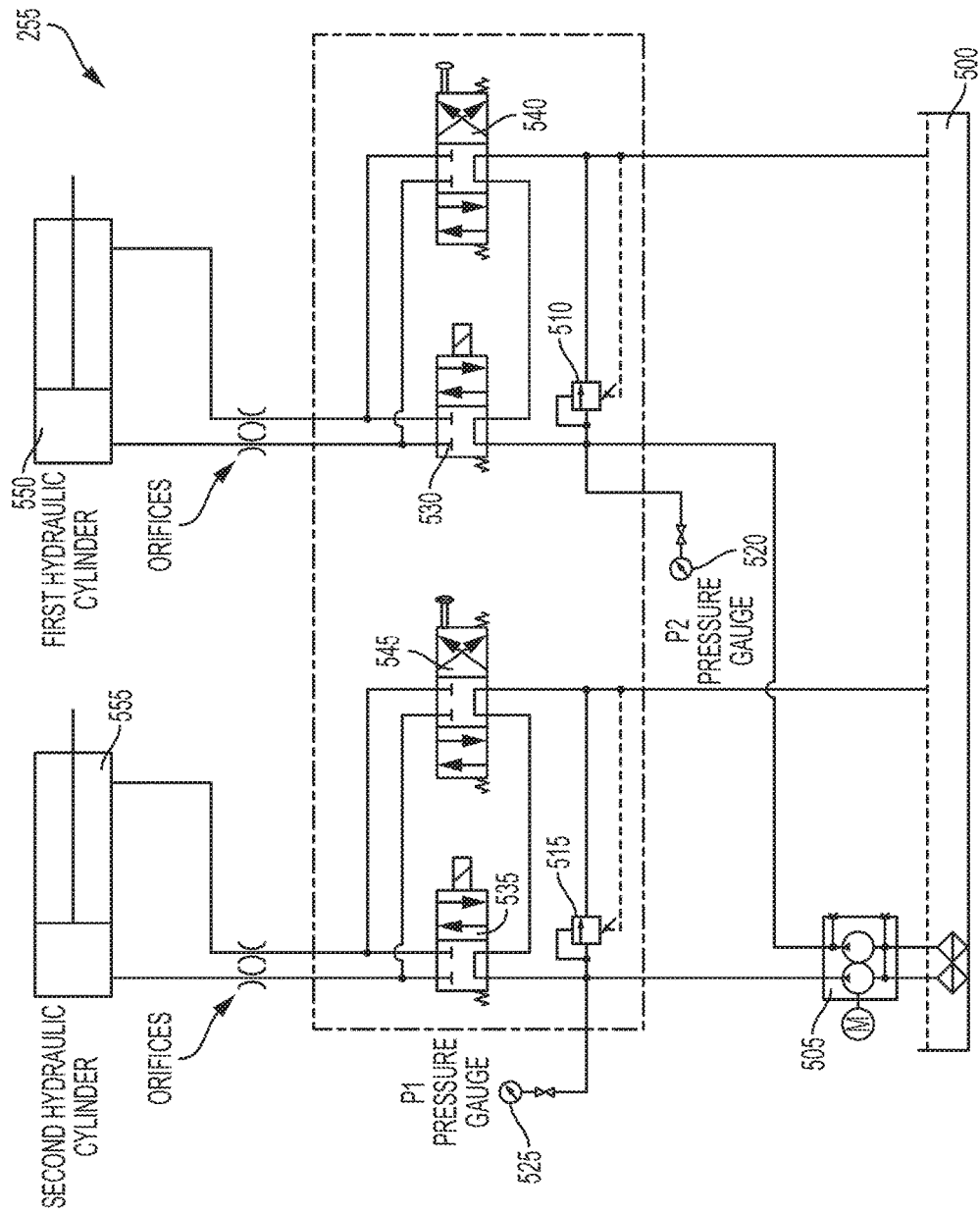
FIG. 5 is a schematic diagram of a hydraulic subsystem of the conveyor tensioning system.

FIG. 5 illustrates a schematic diagram of the hydraulic subsystem 255. As shown in FIG. 5, the hydraulic subsystem 255 includes a hydraulic tank 500, a hydraulic pump 505, a first pressure relief valve 510, a second pressure relief valve 515, a first pressure gauge 520, a second pressure gauge 525, a first solenoid controlled valve 530, a second solenoid controlled valve 535, a first manual valve 540, a second manual valve 545, a first hydraulic cylinder 550, and a second hydraulic cylinder 555. Each hydraulic cylinder 550, 555 includes an extendible piston. The valves 510, 515, 530, 535, 540, 545 are each configured to switch between an open state and a closed state. The hydraulic pump 505 is coupled to the hydraulic tank 500 at an input side of the hydraulic pump 505 to draw fluid from the hydraulic tank 500. Referring back to FIG. 1, the hydraulic pump 505 is positioned on a first side of the crusher 150.

At an output side, the hydraulic pump 505 is coupled to the first pressure relief valve 510, the second pressure relief valve 515, the first pressure gauge 520, the second pressure gauge 525, the first solenoid controlled valve 530, the second solenoid controlled valve 535, the first manual valve 540, and the second manual valve 545. When the pressure in the hydraulic subsystem exceeds a predetermined threshold, the first pressure relief valve 510 and the second pressure relief valve 515 allow excess pressure to be relieved back to the hydraulic tank 500. In the illustrated embodiment, the predetermined pressure threshold is set at 600 psi (pounds per square inch). In other embodiments, however, the predetermined pressure threshold may be different. The first and second pressure relief valves 510, 515 inhibit the hydraulic subsystem 255 to operate at a pressure that exceeds the predetermined pressure threshold. Therefore, the operation of the hydraulic subsystem remains at approximately 600 psi. The first pressure gauge 520 and the second pressure gauge 525 output a pressure signal corresponding to a current pressure in the hydraulic subsystem 255. In some embodiments, the first pressure gauge 520 and the second pressure gauge 525 may communicate with the electronic subsystem 250 to allow for a more convenient display of the current pressure of the hydraulic subsystem 255, and/or for use of the current pressure of the hydraulic subsystem 255 for control of the conveyor tensioning system.

The solenoid controlled valves 530, 535 control the pressure reaching the first and second hydraulic cylinders 550, 555. The solenoid controlled valves 530, 535 receive activation signals from the electronic subsystem 250. When the solenoid controlled valves 530, 535 receive the activation signal (i.e., when the solenoid controlled valves 530, 535 are activated), the valves switch from a closed state to an open state. While the solenoid controlled valves 530, 535 are closed, the first and second hydraulic cylinders 550, 555 do not receive a driving force from the hydraulic pump 505. However, while the first solenoid controlled valve 530 is open, the first hydraulic cylinder 550 is driven by the hydraulic pump 505. Analogously, while the second solenoid controlled valve 535 is open, the second hydraulic cylinder 555 is driven by the hydraulic pump 505. When the hydraulic cylinders 550, 555 are driven by the hydraulic pump 505, the extendible piston of each cylinder is extended away from the body of the cylinder 550, 550. In the illustrated embodiment, the first solenoid controlled valve 530 and the second solenoid controlled valve 535 are spring loaded, solenoid controlled two-way valves. In other embodiments, however, other types of solenoid controlled valves may be used.

The first and second manual valves 540, 545 provide a back-up mechanism to control the mechanical subsystem 260. The first and second manual valve 540, 545 are manually operated through, for example, a mechanical actuator (not shown). When the solenoid controlled valves 530, 535 are inaccessible (or malfunction) due to, for example, lack of electrical power, the first and second manual valves 540, 545 may be used in place of the solenoid controlled valves 530, 535. The manual valves 540, 545 are coupled to the hydraulic pump 505 and the first and second hydraulic cylinders 550, 555, respectively. The manual valves 540, 545 are connected in parallel to the solenoid controlled valves 530, 535 such that the manual valves 540, 545 may serve as a back-up mechanism for the solenoid controlled valves 530, 535.

Additionally, while in some embodiments, the solenoid controlled valves 530, 535 operate only in a forward way (i.e., to provide pressure to extend the hydraulic cylinders 550, 555), the manual valves 540, 545 may operate in reverse such that the hydraulic cylinders 550, 555 retract. Retraction of the hydraulic cylinders 550, 555 causes the conveyor 105 to become less tensioned. Therefore, in instances when the conveyor 105 is over-tensioned, or a new conveyor chain is installed, the manual valves 540, 545 are operated to run the mechanical subsystem 260 in reverse and decrease the tension of the conveyor 105. In other embodiments, the solenoid controlled valves 530, 535 may also cause the mechanical subsystem 260 to operate in reverse, such that a decrease in conveyor tension may be achieved using the solenoid controlled valves 530, 535 or the manual valves 540, 545.

When driven by the hydraulic pump 505, the first and second hydraulic cylinders 550, 555 extend (e.g., telescope outward). The first and second hydraulic cylinders 550, 555 are coupled to the mechanical subsystem 260 to move the tail shaft 115 away from the centerline 200 of the conveyor 105. In other embodiments, the first and second hydraulic cylinders 550, 555 are configured to move the head shaft 110 instead of the tail shaft 115. In yet other embodiments, four hydraulic cylinders are used to move both sides of the tail shaft 115 and both sides of the head shaft 110.

FIGS. 6-8 illustrate the mechanical subsystem 260. FIGS. 6-8, however, illustrate only the first side of the mechanical subsystem 260. In other words, while the conveyor tensioning system includes both a first hydraulic cylinder and a second hydraulic cylinder, for the sake of description only the first hydraulic cylinder is illustrated in FIGS. 6-8. It is to be understood, however, that the second side of the mechanical subsystem 260 mirrors the first side of the mechanical subsystem 260 as described herein. FIG. 6 illustrates an exploded view of the mechanical subsystem 260. As shown in FIG. 6, the first side of the mechanical subsystem 260 includes a locking mechanism 600 coupled to the first hydraulic cylinder 550. The locking mechanism 600 includes several supporting portions 605a-605d that when assembled form a frame 610 (FIGS. 7-8).

The locking mechanism 600 also includes a take-up bar 615, a coupling bushing 620, and a locking plate 625. The locking plate 625 includes a locking member 650, a spring 655, a base 660, and a stopper 665. The locking member 650 includes a first portion of a ratcheting mechanism. The first portion of the ratcheting mechanism is positioned along a length of the locking member 650, and includes a plurality of ratchet grooves 670 on a bottom surface of the locking member 650. The take-up bar 615 includes a second portion of the ratcheting mechanism to engage with the first portion of the ratcheting mechanism of the locking plate 625. The second portion of the ratcheting mechanism includes a plurality of teeth 630 on a top surface of the take-up bar 615 and along a length 635 of the take-up bar 615. On a first end, the take-up bar 615 includes a coupling mechanism 640 to couple to the coupling bushing 620. The take-up bar 615 also includes a cavity 642 to receive a fastener 645 of the first hydraulic cylinder 550. The coupling bushing 620 connects the take-up bar 615 to the tail shaft 115, as shown in FIGS. 7 and 8. As shown in FIG. 6, the length 635 of the take-up bar 615 is longer than the length of the locking member 650 (consequently, the number of ratchet grooves 670 of the locking member 650 are less than the number of ratchet teeth of the take-up bar). In other words, the second portion of the ratcheting mechanism is longer than the first portion of the ratcheting mechanism.

FIG. 7 illustrates a perspective view of the first side of the mechanical subsystem 260 and FIG. 8 illustrates a side view of the first side of the mechanical subsystem 260. As shown in FIGS. 7-8, the first side of the mechanical subsystem 260 is coupled to the tail shaft 115. The frame 610 supports the take-up bar 615 and the locking plate 625. As shown in FIGS. 7 and 8, the take-up bar 615 is coupled to the first hydraulic cylinder 550 on a first end, and is coupled to the coupling bushing 620 on an opposite end. FIG. 8 illustrates each of the teeth 630 of the take-up bar 615 including a sloped portion 675 and a vertical portion 680 joint to form a point 685. Each point 685 of the teeth 630 is separated by a uniform distance, or pitch, from other adjacent points 685. In the illustrated embodiment, the teeth 630 are separated by half-inch increments. In other embodiments, however, the distance between each tooth 630 is different.

As shown in FIG. 8, the locking member 650 is coupled to the stopper 665 via the spring 655. The spring 655 biases the locking member 625 downward toward the take-up bar 615 to a lock position. The grooves 670 of the locking plate 625 engage the teeth 630 of the take-up bar 615 such that when the locking member 650 is biased downward by the spring 655, the grooves 670 of the locking plate 625 lock the take-up bar 615 in place. Therefore, the locking member 650 imparts a locking force 690 downward on the take-up bar 615.

Figure 9:
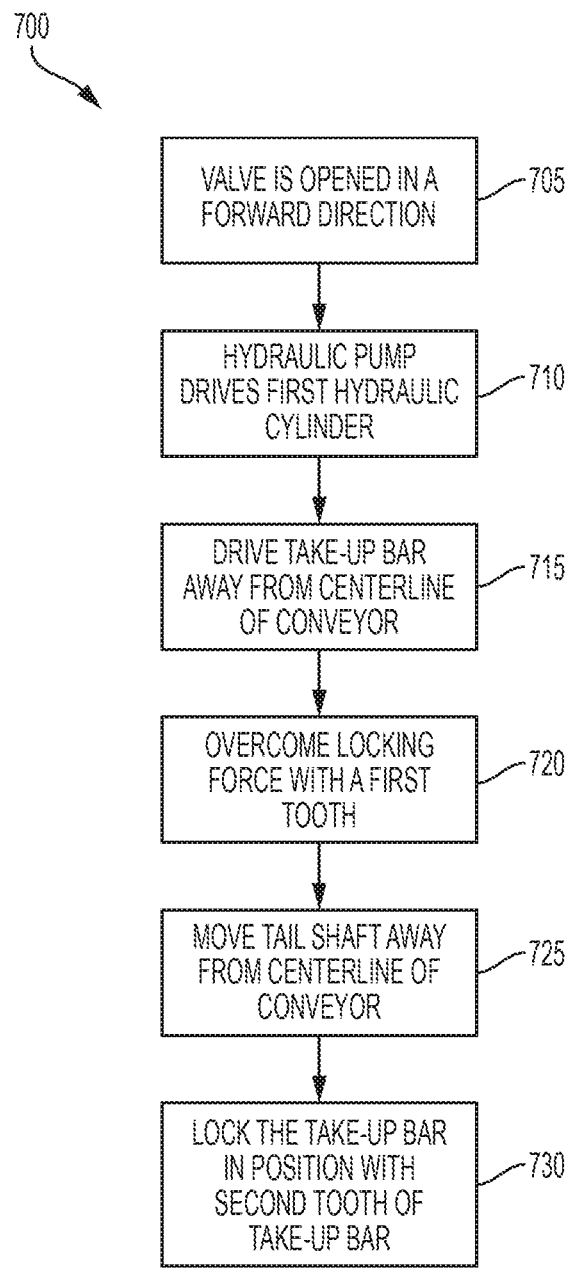
FIG. 9 is a flowchart illustrating a method of operation of the mechanical subsystem.

FIG. 9 is a flowchart illustrating a method 700 of operating the mechanical subsystem 260. Although the flowchart of FIG. 9 is described with respect to the first side of the mechanical subsystem 260, it is to be understood that the operation of the second side of the mechanical subsystem mirrors the operation of the first side of the mechanical subsystem 260. In some embodiments, the operation of the first side of the mechanical subsystem 260 and the operation of the second side of the mechanical subsystem 260 occur simultaneously. However, in some embodiments and/or situations, the first side of the mechanical subsystem 260 operates separately from the second side of the mechanical subsystem 260. In the illustrated embodiment, the first side of the mechanical subsystem 260 operates separately from the second side of the mechanical subsystem 260 because the first chain 120 is different from the second chain 125. An operator observes the tension of the first side of the conveyor 105 and the second side of the conveyor 105 such that the conveyor 105 achieves proper tension on both the first side and the second side of the conveyor 105.

First, one of the valves (e.g., the first solenoid controlled valve 530 or the first manual valve 540) is opened in a forward direction (block 705). Which valve is opened and what causes the valve to open depends on whether the conveyor tensioning system receives electrical power and whether the conveyor tensioning system operates in the automatic or the manual mode. As explained in more detail below, when the conveyor tensioning system does not receive electrical power, only the first manual valve 540 may be opened, but when the conveyor tensioning system receives electrical power, the solenoid controlled valve 530 is opened. As discussed above, while the first solenoid controlled valve 530 or the first manual valve 540 is open, the hydraulic pump 505 drives the first hydraulic cylinder 550 (block 710). As the first hydraulic cylinder 550 is extended by the hydraulic pump 505, the first hydraulic cylinder 550 drives the take-up bar 615 away from the centerline 200 of the conveyor 105 (block 715). The take-up bar 615, using the energy from the first hydraulic cylinder 550, overcomes the locking force 690 from the locking plate 625 with a first tooth A (FIG. 10), or a first set of teeth, of the take-up bar 615 (block 720). In particular, the sloped portion 675 of the teeth 630 of the take-up bar 615 overcomes the locking force 690 from the locking plate 625.

Figure 10:
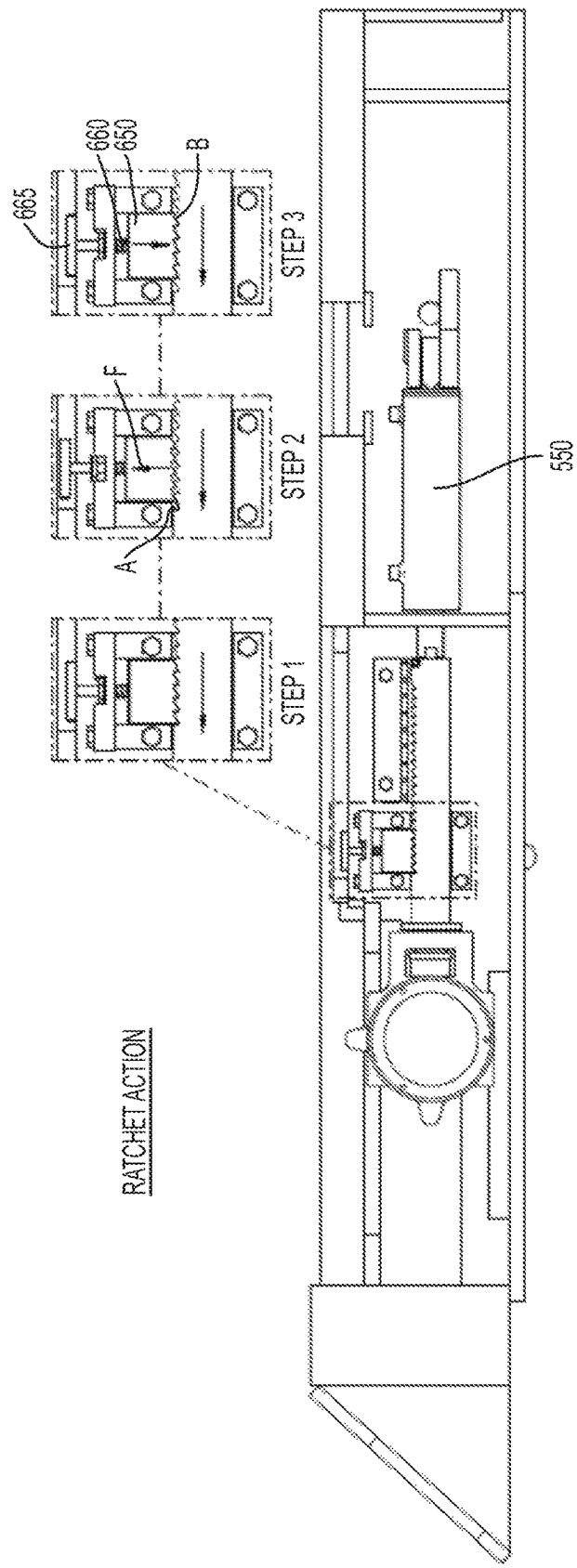
FIG. 10 is a diagram illustrating the operation of the mechanical subsystem.

FIG. 10 illustrates an enlarged view of the locking mechanism 600 in operation. Step 2 of FIG. 10 illustrates the teeth 630 of the take-up bar 615 perform a ratcheting function on the locking plate 625. In particular, the sloped portion 675 of the teeth 630 of the take-up bar 615 imparting an upward force F on the locking plate 625 thereby overcoming the locking force 690.

As the take-up bar 615 overcomes the locking force 690 from the locking plate 625, the take-up bar 615 moves the tail shaft 115 away from the centerline 200 of the conveyor 105 (block 725). In other words, the mechanical subsystem 260 increases the tension of the first chain 120 of the conveyor 105 by moving the tail shaft 115 away from the centerline 200 of the conveyor 105. When a proper position of the tail shaft 115 is reached, a second tooth B of the take-up bar is engaged with the locking plate 625 thereby locking the take-up bar 615 in its new position (block 730). The vertical portion 680 on the teeth 630 of the take-up bar 615 allows the locking plate 625 to quickly lock the take-up bar 615 in the next position. Step 3 of FIG. 10 illustrates the take-up bar 615 locked in a new position. By slowly (e.g., in half-inch increments) changing the position of the take-up bar 615, the mechanical subsystem 260 can lock the take-up bar 615 in a precise position to set the correct position for the tail shaft 115, and thereby set the proper tension for the conveyor 105. Although the illustrated embodiment is described as moving the tail shaft 115, in some embodiments, the head shaft 110 is moved with respect to the tail shaft 115. In yet other embodiments, both the tail shaft 115 and the head shaft 110 are moved with respect to each other.

The conveyor tensioning system also decreases tension of the conveyor 105 using the first and second manual valves 540, 545, for example, when the conveyor chain(s) are over-tensioned or when a new conveyor chain is installed. In such embodiments, a user manually disengages the locking plate 625 from the take-up bar 615 by, for example, moving the stopper 665 such that the spring 655 stops biasing the locking plate 625 downward. After the locking plate 625 is disengaged, the manual valves 540, 545 may be operated to release some of the tension of the conveyor 105. For example, when the first manual valve 540 is opened in a reverse direction, the first hydraulic cylinder 550 retracts, which causes the tail shaft 115 to move toward the centerline 200 of the conveyor 105. Movement of the tail shaft 115 toward the centerline 200 of the conveyor 105 decreases the tension of the conveyor 105. After the conveyor 105 is properly tensioned, which may be determined, for example, with tension indicators 445a, 445b, a user re-engages the locking plate 625 to maintain the position of the tail shaft 115. In some embodiments, the solenoid-controlled valves 540, 545 may also be used to decrease the tension of the conveyor 105.

Figure 11:
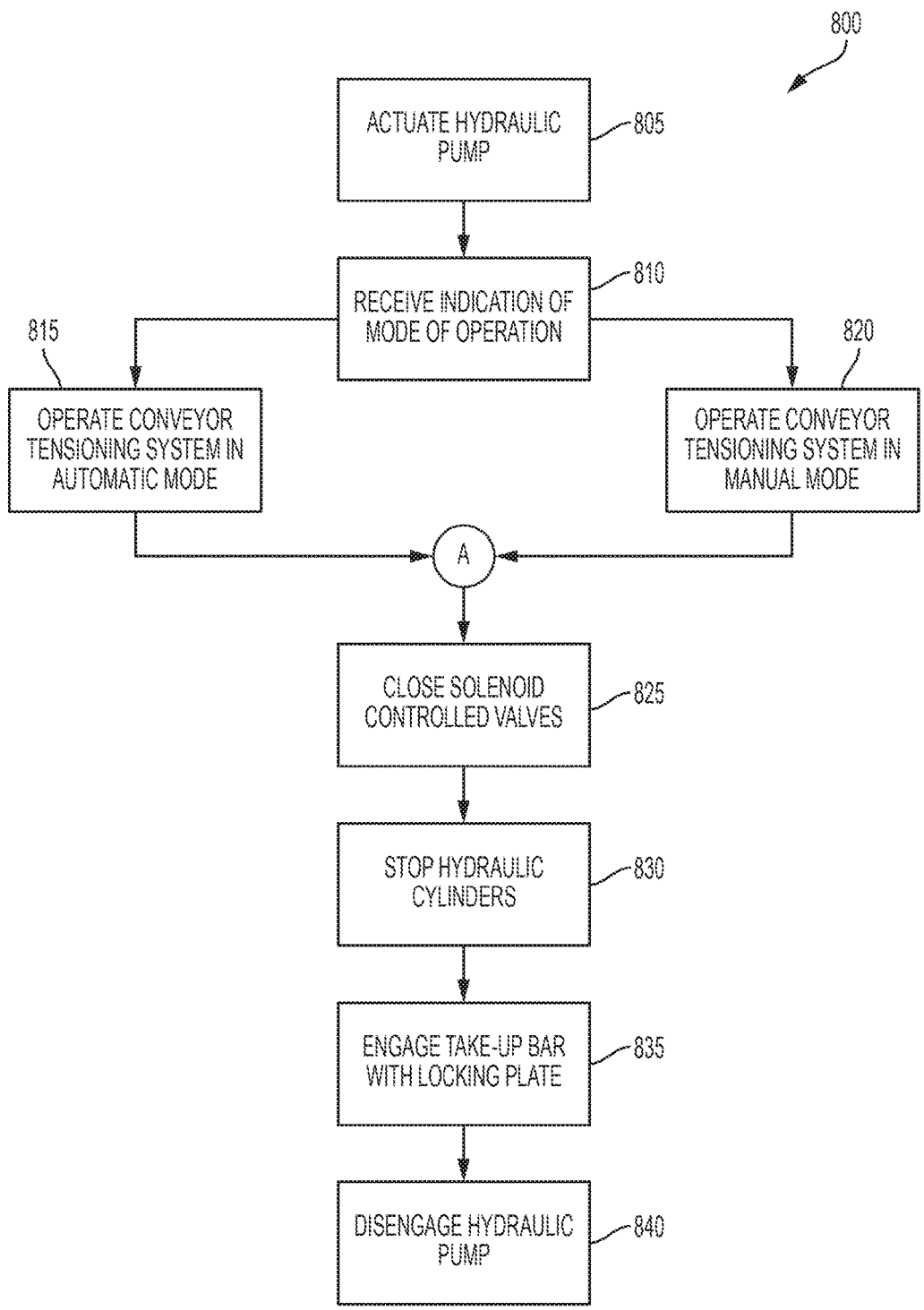
FIG. 11 is a flowchart illustrating a method of operation of the conveyor tensioning system.

FIG. 11 illustrates a method 800 of operation for the conveyor tensioning system. First, the hydraulic pump 505 is actuated (block 805). In some embodiments, a separate actuator is provided to engage (e.g., activate) the hydraulic pump 505. In other embodiments, however, the hydraulic pump 505 is activated when the conveyor tensioning system is activated. Then, the electronic subsystem 250 receives an indication of the mode of operation for the conveyor tensioning system (block 810). When the automatic mode is selected, the conveyor tensioning system is operated in the automatic mode (block 815), shown in more detail in FIG. 12. On the other hand, when the manual mode is selected, the conveyor tensioning system is operated in the manual mode (block 820), shown in more detail in FIG. 13. When the proper tension of the conveyor 105 is achieved, the solenoid controlled valves 530, 535 are deactivated, or closed (block 825). Closing the solenoid controlled valves 530, 535 stops extending the hydraulic cylinders 550, 555 (block 830). The locking plate 625 then engages the take-up bar 615 in the current position (block 835). In some embodiments, for example, when the take-up bar 615 is in the middle of shifting positions (e.g., the teeth 630 of the take-up bar 615 did not fully overcome the locking force 690), the take-up bar 615 moves back to a previous position before being locked in place by the locking plate 625. Finally, the hydraulic pump 505 is disengaged (block 840).

Figure 12:
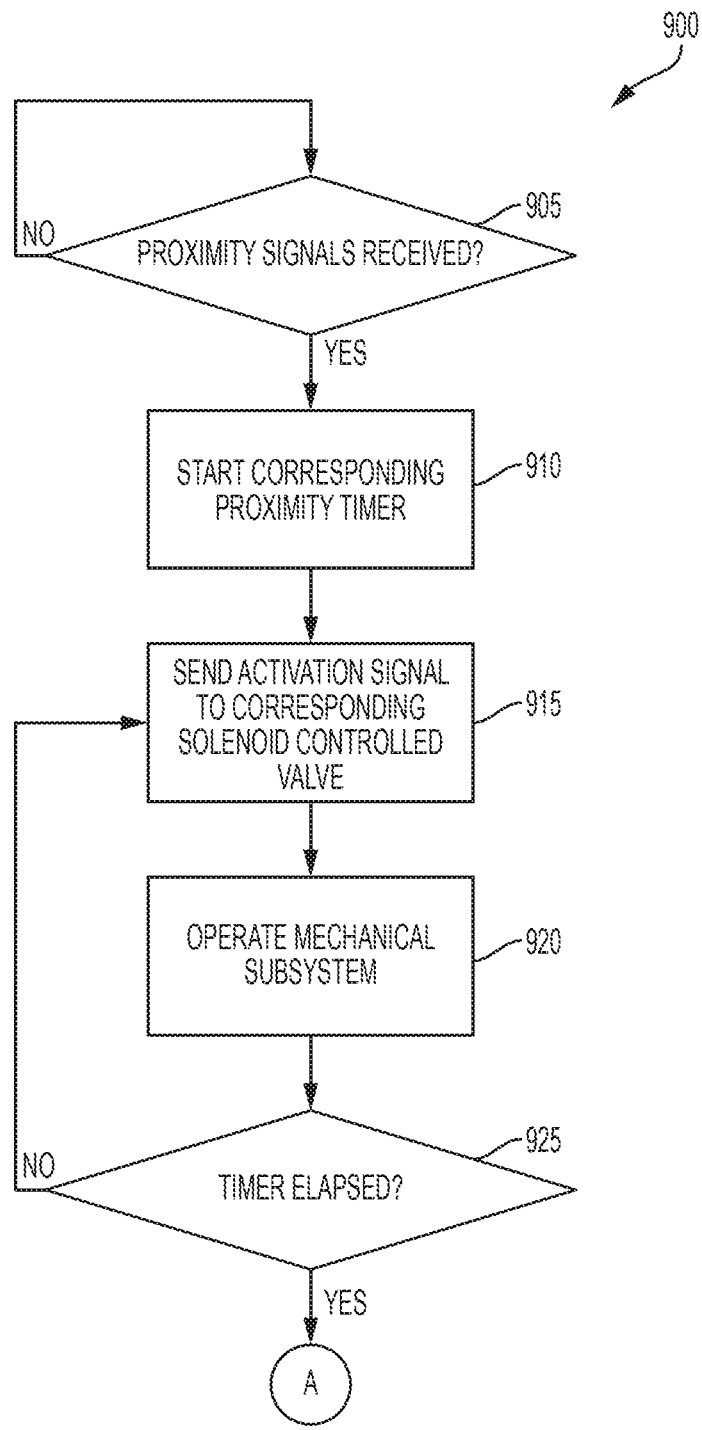
FIG. 12 is a flowchart illustrating a method of operation of the conveyor tensioning system when an automatic mode is selected.

FIG. 12 illustrates a method 900 of operating the conveyor tensioning system in the automatic mode. After receiving selection of the automatic mode of operation, the electronic processor 440 waits to receive a first proximity signal from the first chain proximity sensor 420 and/or a second proximity signal from the second chain proximity sensor 425 (block 905). Not receiving the first proximity signal or the second proximity signal indicates that the conveyor 105 is properly tensioned (or, at least, not under-tensioned). Therefore, the electronic processor 440 continues to monitor for receipt of the proximity signals. On the other hand, receiving the first proximity signal or the second proximity signal indicates that the first or second side of the conveyor 105 is not properly tensioned. Therefore, when the electronic processor 440 receives a proximity signal (e.g., the right proximity signal or the left proximity signal), the electronic processor 440 sends an activation signal to the corresponding solenoid controlled valve (step 910) and starts the corresponding proximity timer (step 915). For example, when the electronic processor 440 receives the first proximity signal, the electronic processor 440 sends the activation signal to the first solenoid controlled valve 530 and starts the first proximity timer 430. On the other hand, when the electronic processor 440 receives the second proximity signal, the electronic processor 440 sends the activation signal to the second solenoid controlled valve 535 and starts the second proximity timer 435.

In response to the activation signal(s) to the first and second solenoid controlled valves 530, 535, the mechanical subsystem 260 is operated as described above with respect to FIGS. 9 and 10 (block 920). The electronic processor 440 then determines whether the corresponding proximity timer 430, 435 has elapsed (block 925). When the proximity timer 430, 435 has not elapsed, the electronic processor 440 continues to provide the activation signal to the corresponding solenoid controlled valve 530, 535 for the solenoid controlled valve to remain open (block 915), and the mechanical subsystem 260 continues to operate. When the proximity timer 430, 435 elapses, the conveyor tensioning system proceeds to deactivate the first and second solenoid controlled valves 530, 535 (block 825 of FIG. 11).

Because the hydraulic subsystem 255 includes the pressure relief valves set at a predetermined pressure, during operation, the hydraulic subsystem 255 remains at the predetermined pressure. This predetermined pressure ensures that the conveyor is properly tensioned within the predetermined hold period of the proximity timer 430, 435. Additionally, during the tensioning of the conveyor 105, operators determine whether the tension on the first side of the conveyor (e.g., the right side) is approximately equal to the tension on the left side of the conveyor (e.g., the left side). If the tensions on opposite sides of the conveyor 105 are different, the operator may change the tension of at least one of the sides to achieve an approximately equal tension.

Figure 13:
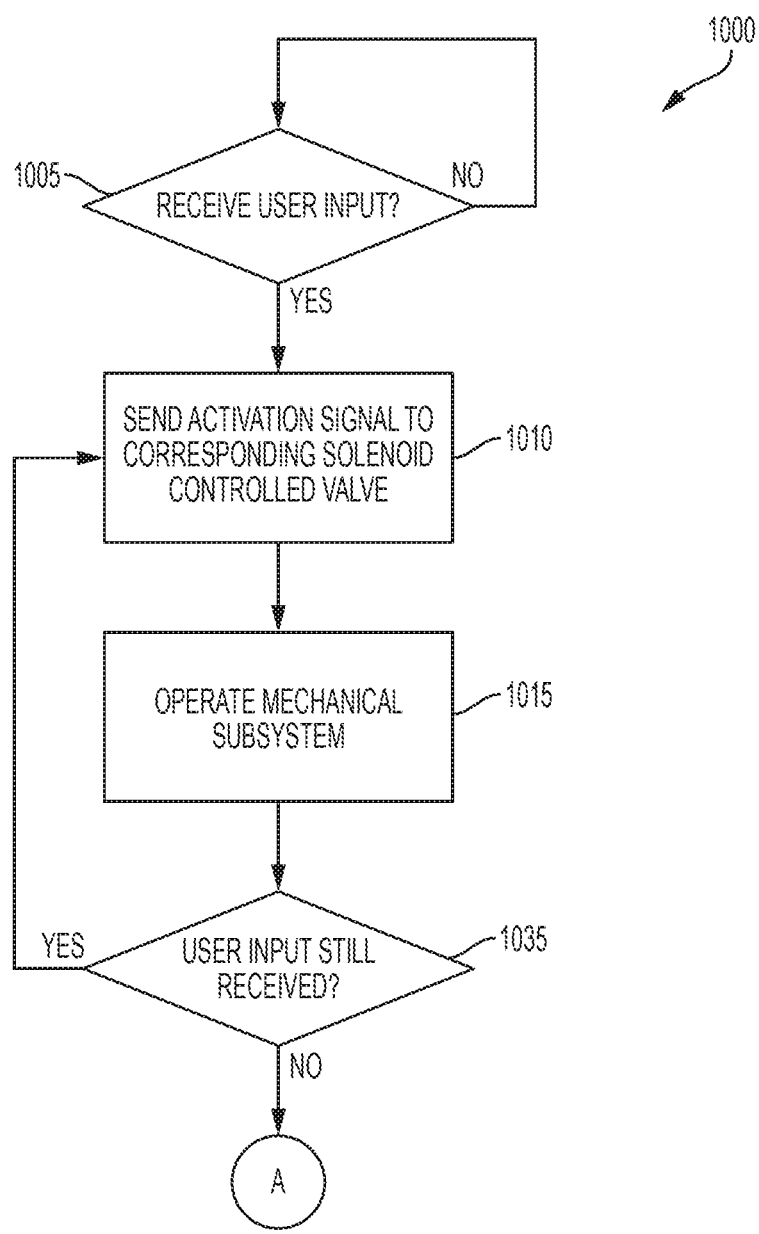
FIG. 13 is a flowchart illustrating a method operation of the conveyor tensioning system when a manual mode is selected.

FIG. 13 is a flowchart illustrating a method 1000 of operation when the conveyor tensioning system operates in the manual mode. After receiving selection of the manual mode of operation, the conveyor tensioning system waits for a user input to be received via the first and/or second tension actuators 450, 455 (block 1005). When the conveyor tensioning system receives the user input from the first or the second tension actuator 450, 455, the electronic subsystem 250 sends the activation signals to the corresponding solenoid controlled valve 530, 535 (block 1010). The electronic subsystem 250 sends an activation signal to the first solenoid controlled valve 530 when the first tension actuator 450 is actuated by the user, and sends an activation signal to the second solenoid controlled valve 535 when the second tension actuator 455 is actuated by the user. In response to sending the activation signal(s) to the first and second solenoid controlled valve(s) 530, 535, the mechanical subsystem 260 operates as described with respect to FIG. 9 (block 1015). The electronic subsystem 250 then determines whether the user input is still received through the first and/or second tension actuators 450, 455 (block 1035).

When the user input is still received through the first and/or second tension actuators 450, 455, the activation signal continues to be provided to the first and/or second solenoid controlled valves 530, 535 (block 1010). When the user input is no longer received (e.g., when a user stops actuating the first and/or second tension actuators 450, 455), the conveyor tensioning system proceeds to deactivate the first and second solenoid controlled valves 530, 535 (block 825 of FIG. 11).

As discussed above, because the hydraulic subsystem 255 is arranges such that a maximum pressure of 600 psi is reached, the conveyor 105 is not over-tensioned even if the user continues to press the first or second tension actuators 450, 455. Additionally, as discussed above with respect to FIG. 12, an operator determines whether a tension of the first chain 120 is approximately equal to the tension of the second chain 125, and makes the necessary changes when the tensions of the first chain 120 and the second chain 125 are significantly different.

Figure 14:
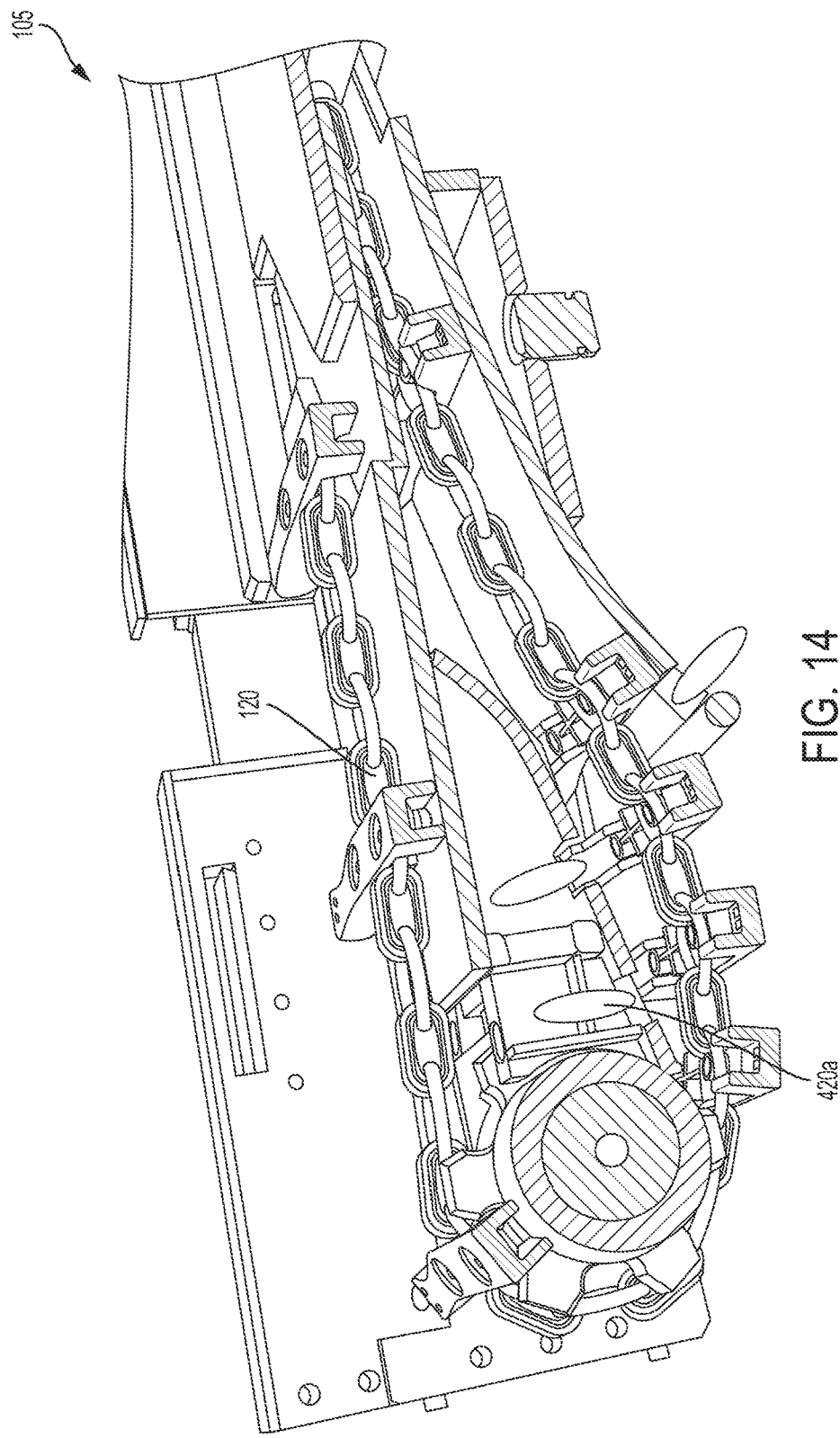
FIG. 14 is a diagram illustrating an exemplary position for a chain sensor of the conveyor of FIG. 3.
Figure 15:
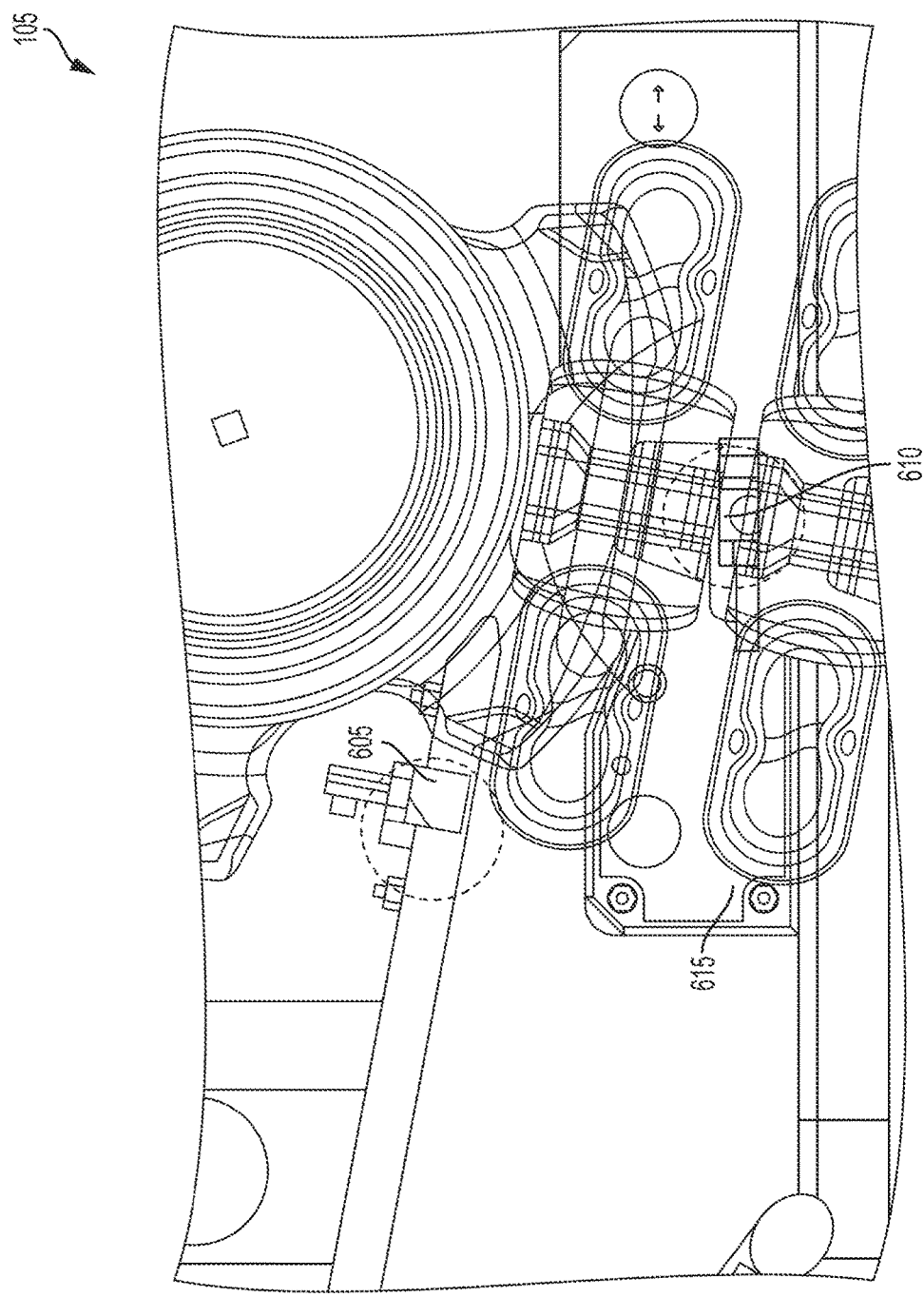
FIG. 15 is a diagram illustrating another exemplary position for a chain sensor of the conveyor of FIG. 3.

FIG. 14 illustrates another example of the conveyor 105*a*, and in particular, of the position of the chain sensor 420*a*. It is to be understood that a similar chain sensor is positioned for the second chain of the conveyor 105*a*. As shown in FIG. 14, the chain sensor 420*a* may be positioned adjacent one of the shafts of the conveyor 100. In the illustrated embodiment, the chain sensor 420*a* is mounted on a sprocket support generally used to support the sprocket. The chain sensors 420*a* detects a number of chain links that are within a particular area. For example, the chain sensor 420*a* may determine how many chain links are within the discharge area of the conveyor 105. The number of chain links in the discharge area serves as an indication of whether the conveyor 105 is under-tensioned or over-tensioned. FIG. 15 illustrates another exemplary positioning of the chain sensor 420*a*. FIG. 15 illustrates that a first chain sensor 605 mounted on the sprocket support and a second chain sensor 610 mounted to a side plate 615 of the conveyor 105. The first chain sensor 605 and the second chain 610 provide information regarding the number of chain links in the discharge area and/or the amount of slack distance.

The conveyor tensioning system and method of operation thereof described herein may be incorporated into other conveyor systems used in mining operations such as, for example, in an armored face conveyor ("AFC"), a beam stage loader ("BSL"), or a different conveyor system. Additionally, although the conveyor tensioning system and methods of operation thereof are described with respect to a chain conveyor, the conveyor tensioning system may be incorporated into other types of conveyor such as, for example, a belt conveyor and other types of conveyors.

Example 1: a method of operating a conveyor tensioning system, the method comprising opening a valve of the conveyor tensioning system, driving, with a hydraulic pump, a hydraulic cylinder when the valve is open, and driving, with the hydraulic cylinder, a take-up bar away from a centerline of a conveyor. The method also comprises overcoming, with a first tooth of the take-up bar, a locking force from a locking plate, moving, with the take-up bar, a drive shaft of a conveyor away from the centerline of the conveyor, and locking the take-up bar by engaging, with the locking plate, a second tooth of the take-up bar.

Example 2: the method of example 1, further comprising receiving an indication of a mode of operation for the conveyor tensioning system, the mode of operation being one of a group consisting of an automatic mode and a manual mode.

Example 3: the method of example 2, wherein the valve includes a solenoid controlled valve, and wherein, when the conveyor tensioning system operates in the manual mode, opening the valve includes receiving, by an actuator, an input signal and sending an activation signal to the valve in response to the input signal.

Example 4: the method of examples 2 and/or 3, wherein, when the conveyor tensioning system operates in the automatic mode, opening the valve includes receiving, from a sensor, an output signal related to a tension characteristic of the conveyor, and sending the activation signal to the valve based on the output signal.

Example 5: the method of example 4, wherein receiving the output signal includes receiving a proximity signal from a proximity sensor, the proximity signal corresponding to a distance between a chain of the conveyor and the proximity sensor, determining, with an electronic processor, whether the chain is within a predetermined distance range from the drive shaft of the conveyor based on the proximity signal, and wherein sending the activation signal based on the output signal includes sending the activation signal to the valve when the chain is outside the predetermined distance range from the drive shaft of the conveyor.

Example 6: the method of any of the examples 1-5, further comprising receiving, by an electronic processor, a proximity signal from a proximity sensor, the proximity signal corresponding to a distance between a chain of the conveyor and the proximity sensor, determining, by the electronic processor, whether the distance between the chain and the proximity sensor is within a predetermined distance range, and closing the valve when the distance between the chain and the proximity sensor is within the predetermined distance range.

Example 7: the method of any of the examples 1-6, further comprising receiving, from a pressure sensor, a pressure signal, the pressure signal being indicative of a tension of the conveyor, determining whether the pressure signal is within a predetermined range, and closing the valve when the pressure signal is within the predetermined range.

Example 8: the method of any of the examples 1-7, further comprising determining whether a first tension of the conveyor is approximately equal to a second tension of the conveyor, and closing the valve when the first tension of the conveyor is approximately equal to the second tension of the conveyor.

Example 9: the method of claim 1, further comprising determining whether a first condition of the conveyor tensioning system is met, determining whether a second condition of the conveyor tensioning system is met, and closing the valve when the first condition and the second condition of the conveyor tensioning system are met.

Example 10: a conveyor tensioning system comprising a valve configured to switch between an open state and a closed state, a hydraulic pump coupled to the solenoid controlled valve and configured to drive a hydraulic cylinder when the solenoid controlled valve is in the open state, a hydraulic cylinder coupled to the valve and to a take-up bar, and configured to drive the take-up bar when the hydraulic cylinder is driven by the hydraulic pump, and a take-up bar. The take-up bar is coupled to the hydraulic cylinder and to a drive shaft of a conveyor, the take-up bar including a first tooth and a second tooth, the first tooth being engaged with a locking plate. The take-up bar is configured to overcome a locking force from the locking plate with the first tooth, and move the drive shaft away from the centerline of the conveyor when the take-up bar is driven by the hydraulic cylinder. The conveyor tensioning system also including a locking plate coupled to the take-up bar and configured to lock the take-up bar by engaging the second tooth of the take-up bar.

Example 11: the system of example 10, further comprising a mode selector configured to indicate a mode of operation of the conveyor tensioning system. The mode of operation being one of a group consisting of an automatic mode and a manual mode.

Example 12: the system of example 11, wherein the valve is a solenoid controlled valve, and further comprising an actuator configured to receive an input signal, wherein when the conveyor tensioning operates in the manual mode, the actuator is configured to send an activation signal to the solenoid controlled valve in response to the input signal.

Example 13: the system of examples 11 or 12, further comprising a sensor configured to generate an output signal related to a tension characteristic of the conveyor, and an electronic processor configured to receive the output signal from the sensor and, when the conveyor tensioning system operates in the automatic mode, send the activation signal to the solenoid controlled valve based on the output signal from the sensor.

Example 14: the system of example 13, wherein the sensor includes a proximity sensor configured to generate a proximity signal corresponding to a distance between a chain of the conveyor and the proximity sensor, and wherein the electronic processor is further configured to determine whether the chain is within a predetermined distance range from the drive shaft of the conveyor based on the proximity signal, and send the activation signal when the chain is outside the predetermined distance range from the drive shaft of the conveyor.

Example 15: the system of any of the examples 10-14, wherein the electronic processor is further configured to receive a proximity signal from a proximity sensor, the proximity signal corresponding to a distance between a chain of the conveyor and the proximity sensor, and determine whether the distance between the chain and the proximity sensor is within a predetermined distance range, and send a close signal to the solenoid controlled valve to close the valve when the distance between the chain and the proximity sensor is within the predetermined distance range.

Example 16: the system of any of the examples 10-15, further comprising a pressure sensor configured to generate a pressure signal being indicative of a tension of the conveyor, and wherein an electronic processor sends a close signal to the solenoid controlled valve when the pressure signal is within a predetermined range.

Various features and advantages of the application are set forth in the following claims.

The invention claimed is:

1. A method of tensioning a conveyor element of a conveyor, the method comprising:
   generating, with a proximity sensor, an output signal indicative of the conveyor element being under-tensioned;
   receiving, with an electronic processor, the output signal from the proximity sensor;
   activating, with the electronic processor, a hydraulic apparatus including a cylinder having an extendible piston;
   pushing, with the cylinder, a take-up bar coupled to the cylinder and to a shaft of the conveyor;
   imparting, via a locking plate, a locking force on the take-up bar;
   overcoming the locking force from the locking plate; and
   moving the shaft of the conveyor away from a centerline of the conveyor with the take-up bar when the cylinder is driven and the locking force is overcome.

2. The method of claim 1, further comprising:
   activating a manual valve with an actuator, the manual valve coupled between a pump and the cylinder of the hydraulic apparatus; and
   driving, with the pump, the extendible piston of the cylinder in response to activating the manual valve.

3. The method of claim 1, wherein generating the output signal includes detecting that the conveyor element is within a detection range of the proximity sensor, and generating the output signal in response to detecting the conveyor element within the detection range.

4. The method of claim 1, further comprising:
   receiving, with the electronic processor, an activation signal from an actuator;
   activating, with the electronic processor, the hydraulic apparatus for a predetermined period of time in response to receiving the activation signal.

5. The method of claim 4, further comprising:
   receiving, with the electronic processor, an indication of a state of a mode selector;
   activating, with the electronic processor, the hydraulic apparatus in response to the output signal from the proximity sensor when the mode selector is in a first state; and
   activating, with the electronic processor, the hydraulic apparatus in response to the activation signal from the actuator when the mode selector is in a second state.

6. The method of claim 1, further comprising biasing, with a spring, the locking plate to a lock position in which a first portion of the ratcheting mechanism is engaged with a second portion of the ratcheting mechanism.

7. The method of claim 1, wherein the proximity sensor is a first proximity sensor and the output signal is a first output signal, and further comprising generating, with a second proximity sensor, a second output signal indicative of the conveyor element; and activating the solenoid-controlled valve based on the first output signal and the second output signal.

* * * * *